United States Patent [19]

Kuramochi et al.

[11] Patent Number: 5,078,013
[45] Date of Patent: Jan. 7, 1992

[54] ULTRASONIC MEASURING APPARATUS USING A HIGH-DAMPING PROBE

[75] Inventors: Mitsugu Kuramochi; Minoru Imai, both of Tokyo, Japan

[73] Assignee: Shimizu Construction Co., Ltd., Tokyo, Japan

[21] Appl. No.: 483,843

[22] Filed: Feb. 23, 1990

[30] Foreign Application Priority Data

| Jun. 9, 1989 | [JP] | Japan | 1-147475 |
| Jun. 9, 1989 | [JP] | Japan | 1-147476 |
| Jun. 13, 1989 | [JP] | Japan | 1-149862 |
| Jun. 13, 1989 | [JP] | Japan | 1-149863 |
| Jun. 26, 1989 | [JP] | Japan | 1-164857 |

[51] Int. Cl.$^5$ .................. G01N 29/18; G01N 29/24
[52] U.S. Cl. ........................... 73/620; 73/602; 73/597; 73/627; 310/326; 310/327
[58] Field of Search ............... 73/597, 598, 602, 620, 73/627, 632; 310/326, 327

[56] References Cited

U.S. PATENT DOCUMENTS

| 3,634,759 | 1/1972 | Ko et al. | 73/659 |
| 3,756,070 | 9/1973 | McElroy | 73/632 |
| 3,794,866 | 2/1974 | McElroy et al. | 73/632 |
| 3,950,660 | 4/1976 | McElroy | 73/632 |
| 4,391,142 | 7/1983 | Cantrell, Jr. et al. | 73/602 |
| 4,420,070 | 12/1983 | VanValkenberg | 310/327 |
| 4,545,250 | 10/1985 | Miwa | 73/602 |
| 4,625,556 | 12/1986 | Sukahara et al. | 73/602 |
| 4,682,497 | 7/1987 | Sasaki | 73/602 |
| 4,800,316 | 1/1989 | Ju-Zhen | 73/642 |
| 4,803,993 | 2/1989 | Ikeda et al. | 73/602 |
| 4,914,952 | 4/1990 | Miyajima et al. | 73/598 |

Primary Examiner—Hezron E. Williams
Assistant Examiner—Rose M. Finley
Attorney, Agent, or Firm—Armstrong, Nikaido, Marmelstein, Kubovcik, & Murray

[57] ABSTRACT

A high-damping probe capable of obtaining not only sound velocity information but also other ultrasonic information useful for ultrasonic testing, such as the frequency and amplitude of the received wave, and also capable of increasing the accuracy of ultrasonic testing of structures made of concrete or other materials. The high-damping probe includes a transducer having a low-frequency damper attached thereto. By virtue of the above-described arrangement, the transmission wave will not oscillate for a long period of time and it is therefore possible to clearly discriminate between the transmission wave and the received wave. Since the received wave can be distinctly separated from the transmission wave, it is possible to obtain ultrasonic information such as the frequency and amplitude of the received wave. Further, it is possible to impart wide-band frequency characteristics to the probe, so that it becomes conformable to an ultrasonic testing device wherein the transmission frequencyt is variable. In addition, an ultrasonic measuring apparatus using the high-damping probe enables highly accurate measurement of the sound velocity of the shear wave, the thickness of the object and the position of an internal void.

2 Claims, 11 Drawing Sheets

ULTRASONIC MEASURING APPARATUS USING A HIGH-DAMPING PROBE

BACKGROUND OF THE INVENTION

The present invention relates to a high-damping probe suitable for use in measurement of the thickness, internal void, compressive strength, etc. of concerete structures by the ultrasonic measuring method.

The present invention also relates to an ultrasonic measuring apparatus for use in quality control and deterioration testing of concrete structures or in nondestructive testing of timbers, fiber reinforced plastics (FRP) and so forth. More particularly, the present invention pertains to an ultrasonic measuring apparatus using a high-damping probe which is capable of accurately measuring the sound velocity of the shear wave and also relates to an apparatus using a high-damping probe which is capable of accurately measuring the thickness of and internal voids in an object of testing.

In the fields of building and civil engineering, various kinds of measurement, such as measurement of the thickness, internal void, compressive strength, etc. of concrete or other materials have heretofore been conducted for the purpose of structural examination, execution control or quality control of concrete structures or civil engineering constructions. These measuring processes are generally carried out in a non-destructive manner using ultrasonic waves. Conventional ultrasonic probes (ultrasonic sensors) and ultrasonic measuring apparatus suffer, however, from the following problems.

Convenional ultrasonic probes will first be explained. A typical conventional ultrasonic probe comprises a transducer 72 which is secured to a front panel 71 which is in turn secured to an opening provided in a metallic casing 70, as shown in FIG. 6. In operation, a plug 73 which is attached to the casing 70 is supplied with an electric pulse from an ultrasonic testing device (not shown), and this electric pulse is transmitted by the transducer 72 after being converted into an ultrasonic pulse. The conventional probe shown in FIG. 6, however, involves the problem that, when an electric pulse is applied thereto, the transmission wave oscillates for a long period of time, as shown in FIG. 7, and consequently the reflected wave and the transmission wave are superposed one upon the other, thus making it exceedingly difficult to clearly discriminate the reflected wave from the transmission wave.

The conventional ultrasonic measuring method and apparatus involve the following problems.

Measurement of the compressive strength of concrete has heretofore been conducted by employing an arrangement such as that shown in FIG. 8(a).

Referring to FIG. 8(a), a transmitting probe 74 that performs transmission of an ultrasonic pulse is disposed on one face of concrete 75 which is an object of measurement of compressive strength, and a receiving probe 76 that detects the wave transmitted through the concrete 75 is disposed on the other face of the concrete 75. The ultrasonic pulse transmitted from the transmitting probe 74 is partly transmitted through the concrete 75 and partly reflected inside it. The transmitted wave is detected by the receiving probe 76, and the waveform of the received signal is displayed on an oscilloscope (not shown). Ultrasonic information that is obtained directly from the waveform of the received signal is a travelling period of the transmitted wave. From the travelling period and the thickness of the concrete 75 obtained in advance by another method, the sound velocity of the ultrasonic pulse is obtained, and the compressive strength of the concrete 75 is determined on the basis of the obtained sound velocity and a calibration curve prepared in advance.

Ultrasonic waves used in ultrasonic testing involve longitudinal and shear waves, and information representative of the sound velocity of the shear wave is particularly essential for obtaining the elastic modulus, which is an important factor of the compressive strength. Accordingly, a shear wave probe is employed to measure the compressive strength. In the shear wave probe 77, however, not only a shear vibration component in the diametrical direction of the transducer but also a thickness vibration component in the direction of the thickness of the transducer are generated, as shown in FIG. 8(b); therefore, not only a shear wave component is generated due to the shear deformation, but also a longitudinal wave component is simultaneously generated due to the thickness deformation. On the oscilloscope is therefore displayed a waveform in which the reflected shear wave component 78 and the reflected longitudinal wave component 79 interfere with each other, as exemplarily shown in FIG. 8(c). Accordingly, it is exceedingly difficult to read only the travelling period of the shear wave. It should be noted that the abscissa axis in FIG. 8(c) represents time. Thus, the conventional shear wave probe suffers from the problems that it is difficult to measure the sound velocity with high accuracy and also difficult to analyze the shear wave only.

In the conventional process for measuring compressive strength, the single-pulse excitation system is often employed. However, since it is difficult with the single-pulse excitation system to generate an ultrasonic wave which efficiently travels through concrete, ultrasonic data obtained by reception of the transmitted ultrasonic wave is likely to be unreliable. In addition, since the conventional probes are of the free vibration type, it is only possible to measure the sound velocity from the received wave and it is difficult to measure other useful ultrasonic data such as the frequency of the received wave and the amplitude of the received pulse. Since the compressive strength of concrete has heretofore been estimated from the propagation velocity as described above, the prior art involves large errors, i.e., $\pm 100 kg/cm^2$, which cannot possibly be tolerated.

As a method of measuring the compressive strength of concrete, a method which uses in combination the sound velocity method and Schmidt rebound hammer is known. This method, however, involves a complicated technique, and no effective equation to estimate the compressive strength of concrete has yet been established.

The following is a description of the conventional process for measuring the thickness of and an internal void in a concrete slab and problems experienced therewith.

Measurement of the thickness of and an internal void in a concrete slab has heretofore been conducted by single or double probe technique. The single probe technique is an inspection method wherein an ultrasonic pulse is transmitted from a probe 80 to a concrete slab 81 as being a testing object and the reflected wave from the inside of the concrete slab 81 is received by the same probe 80, as shown in FIG. 9, the waveform of the received signal being displayed on a display means (not shown), for example, an oscilloscope. Thus, the travelling period of the ultrasoic pulse is obtained from the waveform displayed, and the position of an internal void 82 or the thickness of the concrete slab 81 is determined on the basis of the relationship between the obtained travelling period and a reference sound velocity of the ultrasonic wave in the concrete slab 81 obtained by another method. In measurement of the thickness of the concrete slab 81 or the position of the internal void 82 by the described single probe technique, however, it is difficult to clearly discriminate the reflected wave because the conventional probe involves the phenomenon that the transmission wave oscillates for a long period of time, as shown in FIG. 7, and hence the transmitted pulse is undesirably superposed upon the reflected wave from the bottom of the concrete slab 81 or the internal void 82.

FIG. 10 exemplarily shows an arrangement employed to measure the thickness of concrete or an internal void therein by the method generally known as double probe technique. A transmitting probe 83 and a receiving probe 84 are disposed on the same face. An ultrasonic pulse is transmitted from the probe 83, and the reflected wave from the bottom of the concrete 85 or the internal void 86 is detected by the receiving probe 84. The waveform of the reflected wave is displayed on a display means (not shown), for example, an oscilloscope, and the travelling period of the ultrasonic pulse is read from the displayed waveform, thereby measuring the thickness of the concrete 85 or the position of the internal void 86. In the conventional ultrasonic measuring apparatus and probes, however, the frequency component of the ultrasonic wave used is unconditionally determined by the performance of each individual ultrasonic measuring apparatus. There are therefore cases where measurement cannot be effected because of scattering of attenuation of the ultrasonic pulse, depending upon the cement and aggregate content and type. Moreover, since the transmitted pulse oscillates for a long period of time as shown in FIG. 7, measurement cannot be effected with high accuracy.

It is necessary in order to measure the thickness of an object of inspection to obtain a distinct received wave. With the conventional probe, however, the propagation characteristics of the ultrasonic wave in the object are not always good and it is therefore difficult to obtain a distinct received wave. Accordingly, measurement is difficult to conduct and it is impossible to effect measurement with high accuracy.

To measure the thickness, a reference sound velocity in each individual object of inspection is needed and it is common to measure a reference sound velocity in an object of inspection in advance of measurement of the thickness thereof. However, there has heretofore been a problem that it is difficult to properly dispose two probes for transmission and reception for measurement of the reference sound velocity. More specifically, measurement of the reference sound velocity is generally effected by the through transmission method using two normal probes, and it is therefore necessary to dispose two normal probes for transmission and reception on the obverse and reverse faces, respectively, of an object of inspection. Accordingly, if it is impossible to ensure a space which is sufficiently large to place the receiving probe and an operator who operates it, measurement itself cannot be carried out.

In addition, an object of inspection must have an opening in order to enable measurement of the reference sound velocity by the through transmission method and measurement of the thickness by the echo, or reflection, method. However, many of objects which need measurement of the thickness have no openings; therefore, in many cases it is impossible to measure the reference sound velocity.

Thus, the conventional probes, ultrasonic measuring methods and apparatuses involve many problems.

SUMMARY OF THE INVENTION

In view of the above-described problems of the prior art, it is an object of the present invention to provide a high-damping probe which is capable of obtaining not only sound velocity information but also other ultrasonic information useful for ultrasonic testing, such as the frequency and amplitude of the received wave, and which is also capable of increasing the accuracy of ultrasonic testing of structures made of concrete or other materials.

It is another object of the present invention to provide an ultrasonic measuring apparatus using a high-damping probe which is capable of measuring the travelling period of the shear wave with high accuracy.

It is still another object of the present invention to provide an ultrasonic measuring apparatus using a high-damping probe which is capable of accurately measuring the thickness of an object of testing and the position of an internal void in the object.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

To attain the above-described objects, the high-damping probe according to the present invention comprises a transducer having a low-frequency damper attached thereto.

The first ultrasonic measuring apparatus according to the present invention comprises a transmitting probe constituted of a high-damping probe including a transducer having a low-frequency damper attached thereto, a receiving probe constituted of a high-damping probe including a transducer having a low-frequency damper attached thereto, a first signal converting device for converting the output of the receiving probe into a frequency spectrum, a signal processing device for extracting a desired frequency component from the output of the first signal converting device, a second signal converting device for converting the output of the signal processing device into a time series signal, and a display device for displaying the output of the second signal converting device.

The second ultrasonic measuring apparatus according to the present invention comprises a high-damping, low-frequency, longitudinal wave probe constituted of a high-damping probe including a transducer having a low-frequency damper attached thereto to perform transmission and reception of an ultrasonic pulse in the form of a modulated pulse, a variable-frequency transmitting device for continuously varying the transmission frequency of the ultrasonic pulse, and a display device for displaying the waveform of a signal received by the high-damping, low-frequency, longitudinal wave probe.

Thus, the high-damping probe according to the present invention is adapted to absorb unnecessary low-frequency vibrations of the ultrasonic transducer by means of the damper. Accordingly, the transmission wave will not oscillate for a long period of time and it is therefore possible to clearly discriminate between the transmission wave and the received wave. Thus, detection of an internal void can be effected even by a simple reflection method carried out with a single probe, such as that shown in FIG. 9. In addition, since the waveform of the received wave can be clearly discriminated from the waveform of the transmission wave, it becomes possible to obtain ultrasonic information such as the frequency and amplitude of the received wave. Further, by attaching a low-frequency damper to the transducer, wideband frequency characteristics are imparted to the probe, so that the probe becomes conformable to an ultrasonic testing device wherein the transmission frequency is variable.

According to the first ultrasonic measuring apparatus according to the present invention, the longitudinal and shear wave components can be distinctly separated from each other by converting a time series signal obtained by the receiving probe into a frequency spectrum and it is therefore possible to extract only the shear wave component with ease. Thus, it is possible to precisely measure the sound velocity and travelling period of the shear wave.

According to the second ultrasonic measuring apparatus according to the present invention, the transmission frequency of the ultrasonic pulse is variable and it is therefore possible to effect measurement with a ultrasonic pulse having an optimal transmission frequency which is determined by taking into consideration the properties of each individual object of testing. Since a high-damping, low-frequency, longitudinal wave probe is employed and the ultrasonic pulse is transmitted in the form of a modulated pulse, it is possible to shorten the period of time during which the transmitted pulse oscillates. The transmitted wave and the reflected wave can therefore be distinctly separated from each other and it is possible to increase the accuracy of measurement as being a synergistic effect of these advantageous effects.

DESCRIPTION OF THE PREFERRED EMBODIMENTS

Embodiments will be described below with reference to the accompanying drawings.

Figure 1:
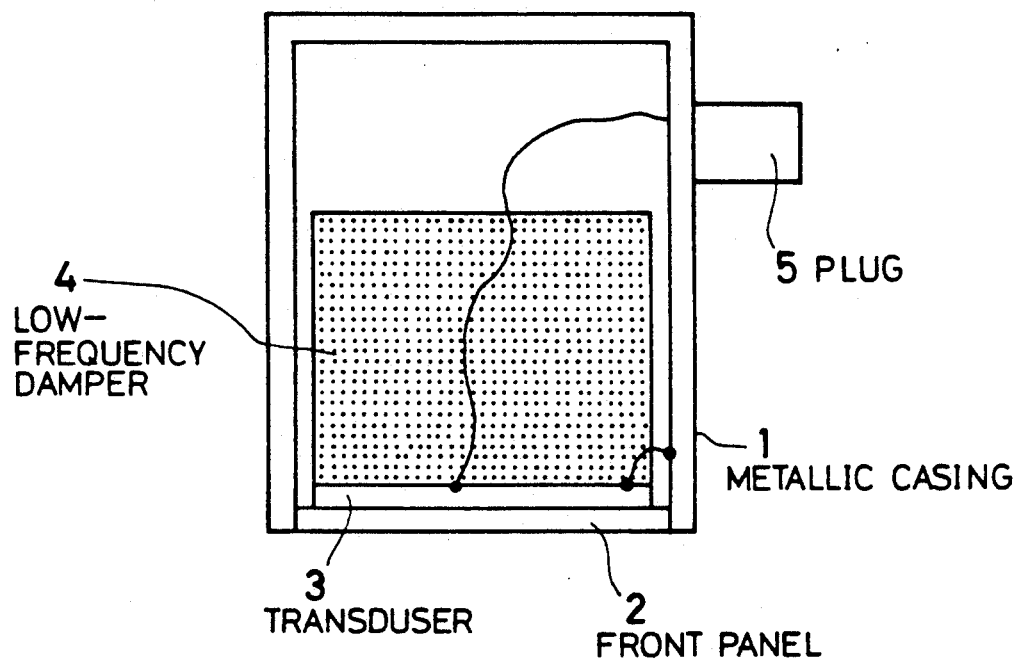
FIG. 1 shows the arrangement of one embodiment of the high-damping probe according to the present invention.

FIG. 1 shows the arrangement of one embodiment of the high-damping probe according to the present invention, in which the reference numeral 1 denotes a metallic casing, 2 a front panel, 3 a transducer, 4 a low-frequency damper, and 5 a plug.

Referring to FIG. 1, the front panel 2 is secured to an opening provided in the metallic casing 1, and the transducer 3 is secured to the front panel 2. The low-frequency damper 4 is attached to the face of the transducer 3 which is remote from the front panel 2. The plug 5 is connected to an ultrasonic measuring apparatus (not shown) so that an electric pulse is supplied from the ultrasonic measuring apparatus to the transducer 3 and transmitted after being converted into an ultrasonic pulse.

The low-frequency damper 4 is provided in order to absorb unnecessary low-frequency vibrations of the transducer 3. The low-frequency damper 4 may be formed using a suitable resin material. It is, however, preferable to use tungsten powder which is compacted with a resin material under a predetermined pressure. Although a resin material alone is capable of damping the vibration of the transducer 3, the damping effect is improved by mixing it with tungsten powder. It has been confirmed that such a mixed material is particularly effective to damp the low-frequency component of ultrasonic waves. However, it is, as a matter of cource, possible to employ any material which is capable of damping unnecessary vibrations of the transducer 3. Although in the embodiment shown in FIG. 1 the low-frequency damper 4 is attached to the transducer 3, it may be provided in such a manner as to fill the metallic casing 1.

Figure 7:
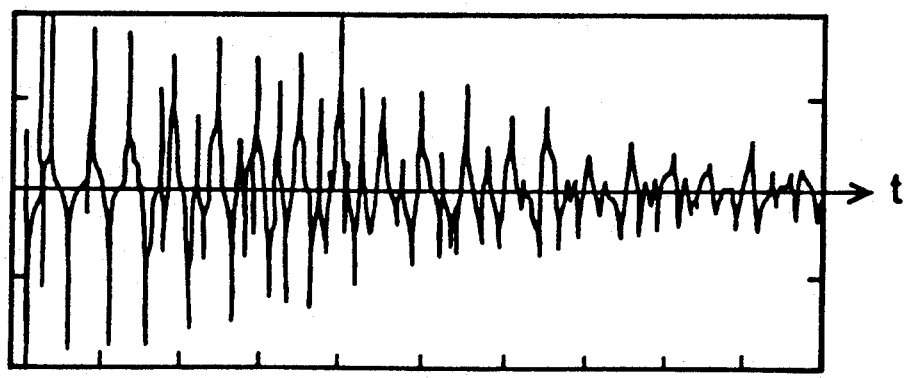
FIG. 7 shows the waveform of the transmission wave transmitted from the conventional probe shown in FIG. 6.
Figure 8A:
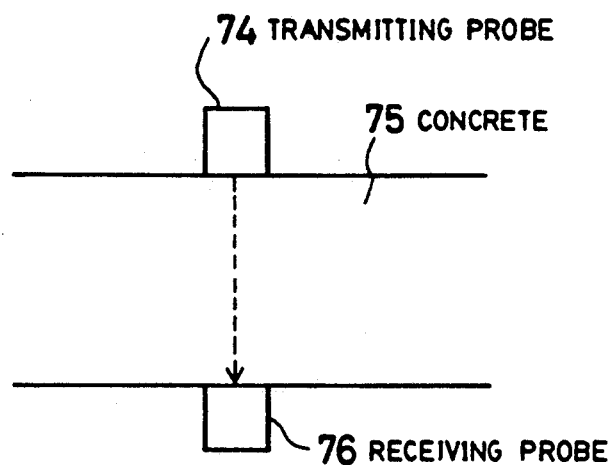
FIG. 8(a)-8(c) illustrate measurement of the compressive strength of concrete by the prior art.
Figure 8B:
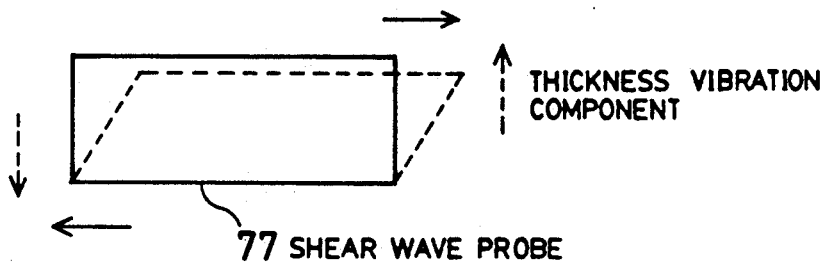
Figure 8C:
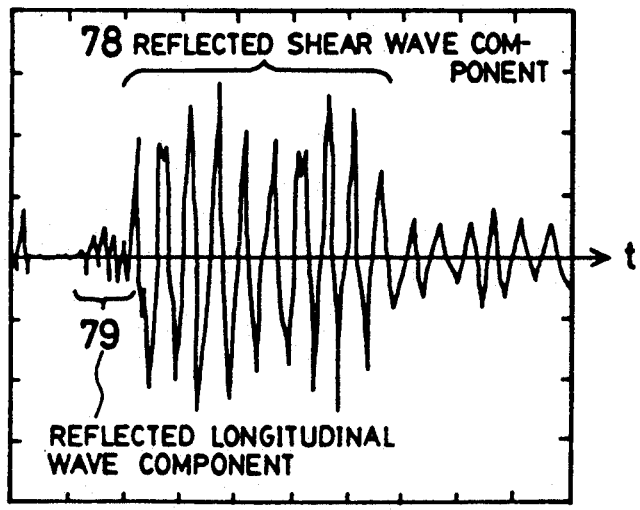
Figure 9:
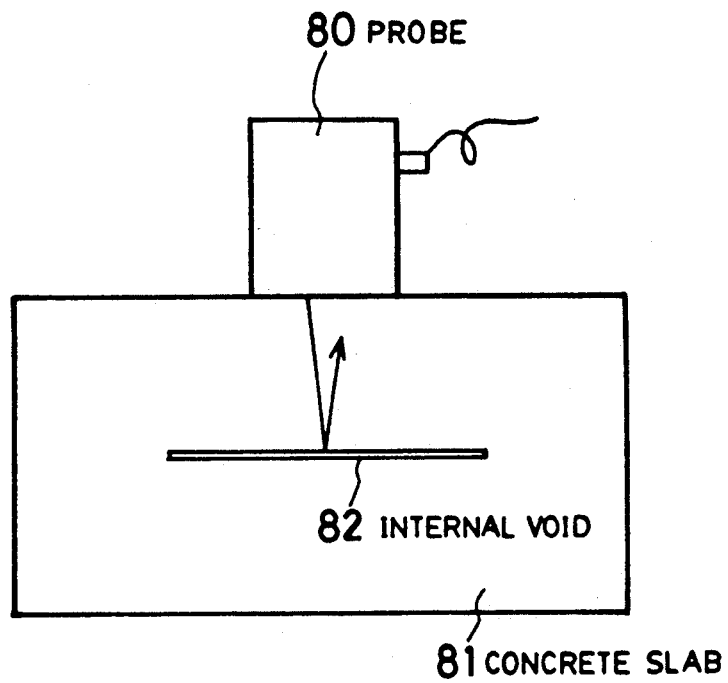
FIG. 9 illustrates measurement of the thickness of and internal void in concrete by the single probe technique.
Figure 10:
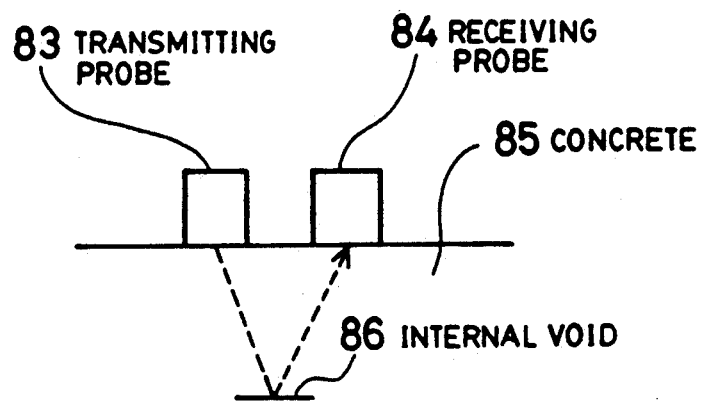
FIG. 10 illustrates measurement of the thickness of and internal void in concrete by the double probe technique.

By virtue of the above-described arrangement, unnecessary low-frequency vibrations of the transducer 3 are absorbed by the low-frequency damper 4 and there is therefore no problem of the transmission wave oscillating for a long period of time as shown in FIG. 7. Accordingly, the transmission wave and the received wave can be clearly discriminated from each other and hence it is possible to obtain not only the sound velocity inside concrete but also various ultrasonic information useful for ultrasonic measurement, such as the frequency and amplitude of the received wave.

The following is a description of an ultrasonic measuring apparatus as being one form of a use of the high-damping probe shown in FIG. 1.

An ultrasonic measuring apparatus employing a high-damping probe which is suitable for use in measurement of the sound velocity of the shear wave, which is needed to obtain the elastic modulus of concrete, will first be explained with reference to FIGS. 2.

Figure 2A:
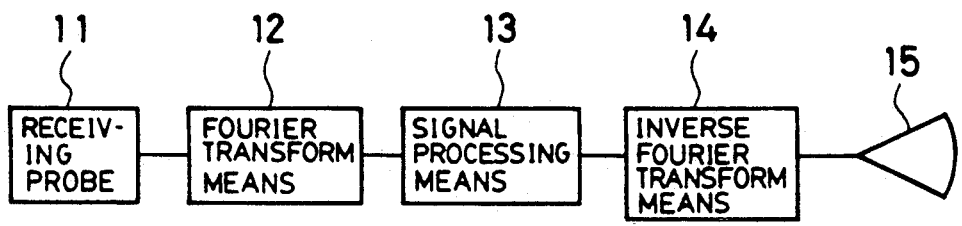
FIG. 2(a)-2(d) illustrate measurement of the sound velocity of the shear wave by an ultrasonic measuring apparatus using the high-damping probe according to the present invention.

FIG. 2(a) is a block diagram showing one example of the arrangement of an ultrasonic measuring apparatus using high-damping probes for measuring the sound velocity of the shear wave, in which the reference numeral 11 denotes a probe for reception, 12 a first signal converting means, 13 a signal processing means, 14 a second signal converting means and 15 a display means, for example, an oscilloscope.

In the arrangement shown in FIG. 2(a), high-damping probes having the arrangement shown in FIG. 1 are employed respectively as the probe 11 for reception and a probe for transmission (not shown). The first signal converting means 12, which converts a time series signal output from the receiving probe 11 into a frequency spectrum, comprises, for example, a fast Fourier transform (FFT) means. The signal processing means 13, which extracts a signal component in a desired frequence band from the output of the first signal converting means 12, comprises a low-pass filter. The second signal converting means 14, which converts a frequency spectrum signal into a time series signal, comprises, for example, an inverse fast Fourier transform (IFFT) means.

Figure 2B:
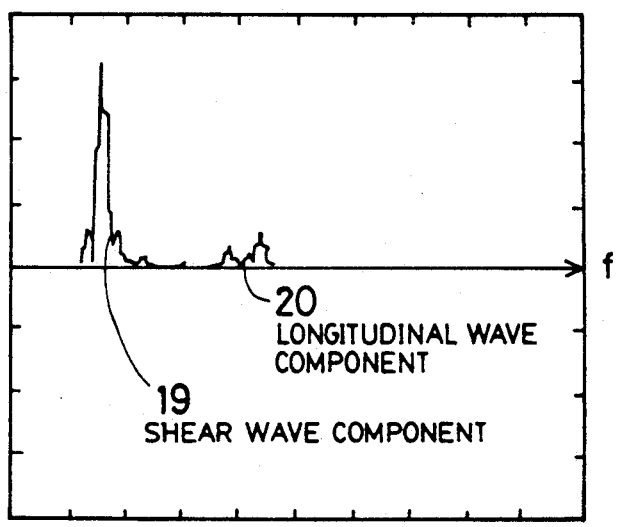
Figure 2C:
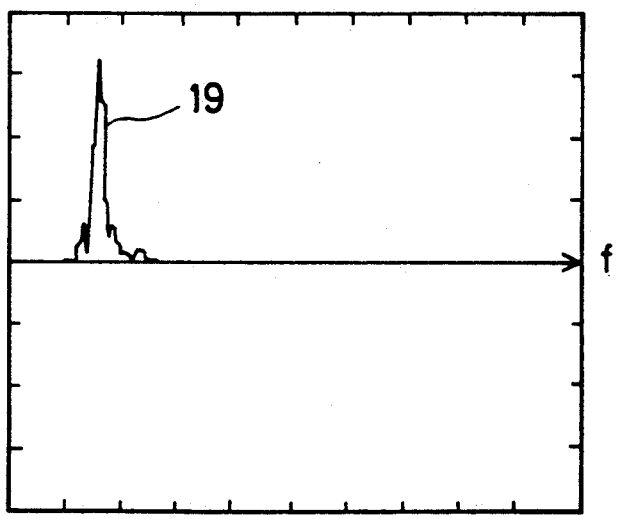
Figure 2D:
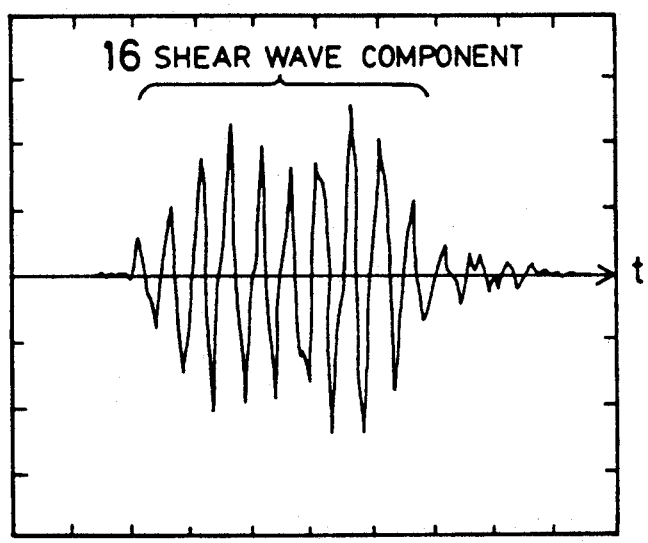

In the above-described arrangement, a time series signal that is output from the receiving probe 11 is converted into a frequency spectrum by the first signal converting means 12. Thus, in the output of the first signal converting means 12, the shear wave component 19 is obtained on the low-frequency side, and the longitudinal wave component 20 on the high-frequency side, as shown in FIG. 2(b). The output of the first signal converting means 12 is supplied to the signal processing means 13 where only the low-frequency component of the output from the first signal converting means 12 is passed. Accordingly, only the shear wave component 19, which is the low-frequency component of the received wave, is obtained as being the output of the signal processing means 13, as shown in FIG. 2(c). The output of the signal processing means 13 is input to the second signal converting means 14 where it is returned to a time series signal form from the frequency spectrum signal form, which is then input to the display means 15. Thus, it is possible to obtain only the signal waveform of the shear wave component 16 of the reflected wave, as shown in FIG. 2(d). Accordingly, it is possible to read the travelling period of the shear wave from the displayed waveform of the shear wave component with a high degree of accuracy, and the sound velocity of the shear wave propagated through a concrete slab can be obtained from the travelling period thus measured and the thickness of the concrete slab which has been known in advance. It should be noted that the abscissa axes in FIGS. 2(b) and 2(c) represent frequency.

With the above-described ultrasonic measuring apparatus, it is possible to clearly discriminate the transmission wave and the received wave by using high-damping probes having the arrangement shown in FIG. 1. In addition, the signal detected by the receiving probe can be distinctly separated into longitudinal and shear wave components. It is therefore possible to read the travelling period of the shear wave with a high degree of accuracy.

Although in the embodiment shown in FIG. 2 the shear wave component is extracted, it will be clear that the longitudinal wave component can also be extracted simply by employing a high-pass filter as the signal processing means 13.

An ultrasonic measuring apparatus employing a high-damping probe which is suitable for use in measurement of the thickness of and an internal void in a concrete slab by the single probe technique will next be explained with reference to FIG. 3.

Figure 3A:
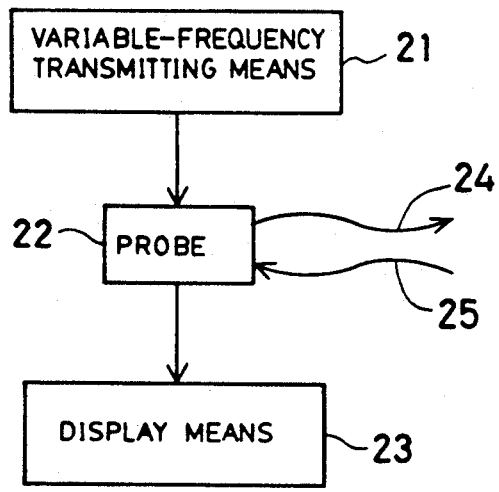
FIG. 3(a)-3(c) illustrate measurement of the thickness of and an internal void in concrete by an ultrasonic measuring apparatus using the high-damping probe according to the present invention.

Referring to FIG. 3(a), the probe 22 is a high-damping, low-frequency, longitudinal wave probe which is capable of both transmission and reception. The variable-frequency transmitting means 21, which is designed so that the transmission frequency is variable, enables variation of the frequency of the ultrasonic wave transmitted from the probe 22.

Figure 3B:
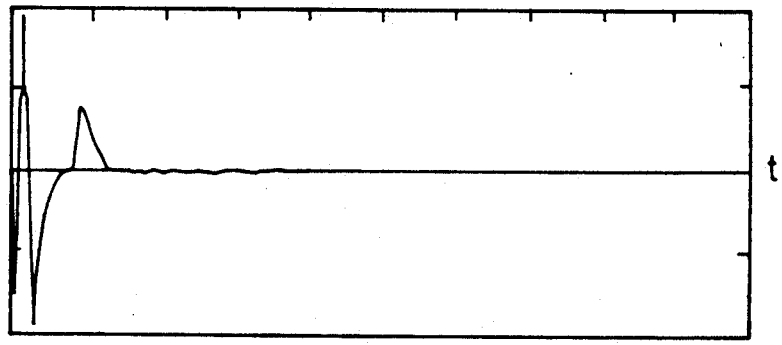
Figure 3C:
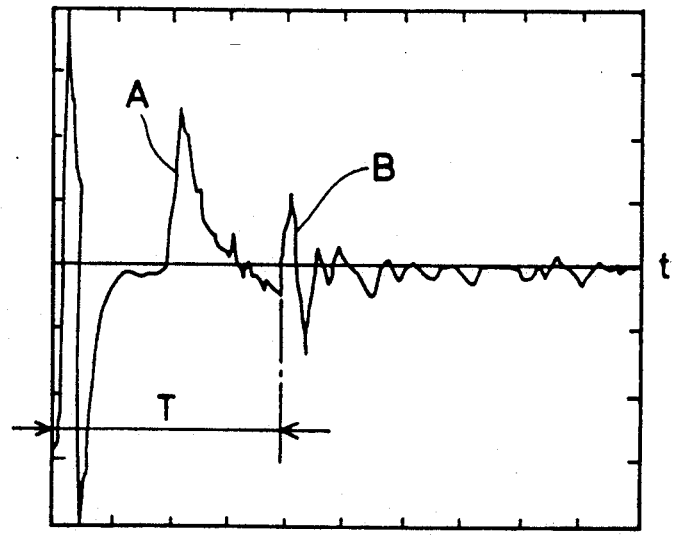

The transmission wave 24 from the probe 22 is transmitted in the form of a modulated pulse such as that exemplarily shown in FIG. 3(b) with a view to shortening the pulse width of the transmission wave. The reflected wave 25 from the bottom of or an internal void in a concrete slab (not shown) is received by the probe 22. The reflected wave signal received is input to a display means 23 comprising, for example, an oscilloscope, where the waveform is displayed.

In the above-described arrangement, the variable-frequency transmitting means 21 is provided in order to enable the probe 22 to transmit a ultrasonic pulse having a frequency which is conformable to the material of each individual concrete slab. Thus, it is possible to prevent scattering and attenuation of the ultrasonic pulse within the concrete slab under inspection, which have heretofore been experienced in the prior art.

The single probe technique involves the problem that the reflected wave and the transmission wave are superposed one upon the other, as stated above. This problem arises from the fact that the transmission wave from the conventional probe oscillates for a long period of time. In contrast, in the ultrasonic measuring apparatus shown in FIG. 3(a), the transmission wave will not oscillate for a long period of time because a high-damping probe having the arrangement shown in FIG. 1 is used as the probe 22. In addition, since the transmission wave 24 are transmitted in the form of a modulated pulse to shorten the pulse width of the transmission wave, it is possible to prevent superposition of the transmission wave and the reflected wave. More specifically, the pulse width can be reduced to about 1/100 of that in the prior art merely by using a high-damping, low-frequency, longitudinal wave probe as the probe 22 and, in addition, the transmission wave is transmitted in the form of a modulated pulse instead of a conventional damped oscillation type pulse such as that shown in FIG. 7. It is therefore possible to reduce the harmonic component and transmit a wide-band ultrasonic wave having a single center frequency component. As a result, it is possible to shorten the pulse width of the transmission wave and hence prevent superposition of the transmission wave and the reflected wave.

The following is a description of measurement of an internal void in concrete that is effected by employing the ultrasonic measuring apparatus using a high-damping probe, shown in FIG. 3(a).

First, the probe 22 is disposed on the surface of a concrete slab as being an object of testing. Ultrasonic pulses are projected with the transmission frequency being continuously varied from about 100kHz to about 500kHz by the variable-frequency transmitting means 21, and the reflected wave 25 is received to obtain a frequency $f_0$ at which the echo height of the received wave reaches its maximum.

Next, with the transmission frequency set at $f_0$, an ultrasonic pulse is projected into the concrete slab, and the reflected wave from the bottom of the concrete slab and that from an internal void in the slab are received by the probe 22. The waveform of the received wave is exemplarily shown in FIG. 3(c). The reference symbol A in FIG. 3(c) denotes the transmission wave, and B the reflected wave from the bottom or the internal void. It will be understood from the figure that the transmission wave and the reflected wave are not superposed one upon the other. Assuming that the time interval between the transmission of the ultrasonic pulse and the rise of the reflected wave B is represented by T and the reference velocity of the ultrasonic wave in the concrete slab at the frequency $f_0$ obtained in advance is represented by V, the distance D from the surface of the concrete slab to the bottom or the internal void, which is the source of reflection, can be obtained from the following equation:

$$D = V \times T$$

It should be noted that the range within which the frequency of the ultrasonic pulse is variable can be properly changed in accordance with the properties of each individual object of measurement.

As will be clear from the foregoing description, the ultrasonic measuring apparatus of the present invention is capable of varying the transmission frequency of the ultrasonic pulse and therefore enables measurement with an ultrasonic pulse having an optimal frequency which is determined by taking into consideration the properties of each individual object of testing. Since a high-damping, low-frequency, longitudinal wave probe is employed and the transmission wave is transmitted in the form of a modulated pulse, it is possible to shorten the period of time during which the transmission wave oscillates and hence distinctly separate the transmission wave and the reflected wave from each other. Thus, it is possible to increase the accuracy of measurement as being a synergistic effect of these advantageous effects.

As another form of use application of the high-damping probe according to the present invention, a method of measuring the compressive strength of concrete will next be explained with reference to FIGS. 4.

Figure 4A:
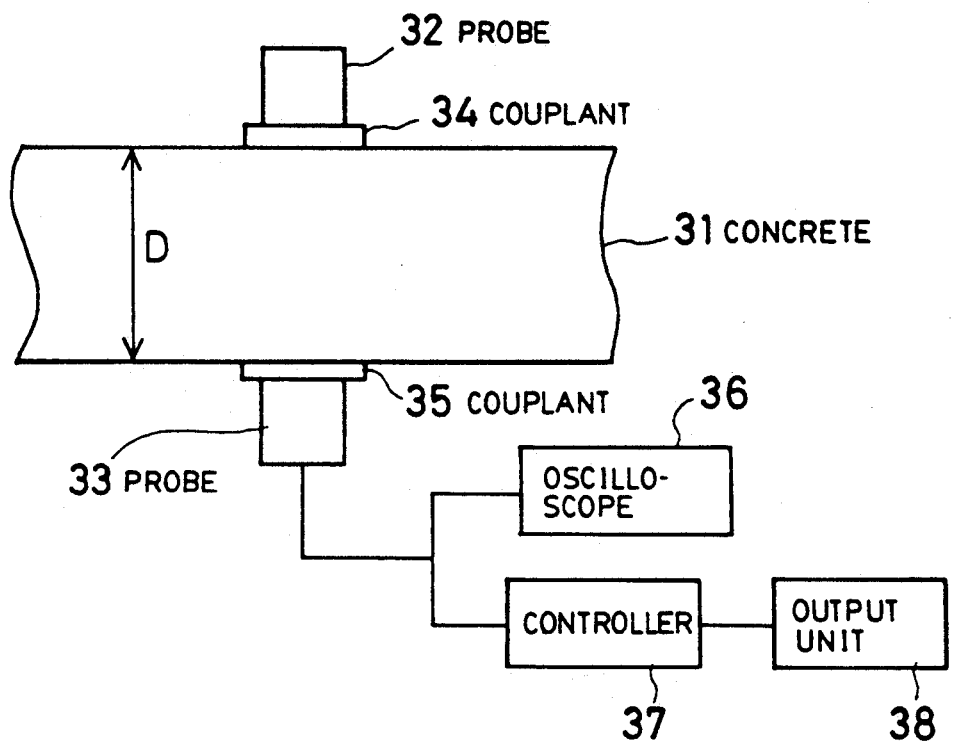
FIG. 4(a)-4(e) illustrate measurement of the compressive strength of concrete using the high-damping probe according to the present invention.

FIG. 4(a) illustrates an arrangement for measuring the compressive strength of concrete by the through transmission method using high-damping probes, in which the reference numeral 31 denotes concrete as being an object of measurement, 32 a probe for transmission, 33 a probe for reception, 34, 35 couplants, 36 an oscilloscope, 37 a controller, and 38 an output unit.

On both sides of the concrete 31, which is to be measured in terms of compressive strength, are disposed the probes 32 and 33 in such a manner as to face each other through the respective couplants 34 and 35 each comprising a proper constituent material. As each of the transmitting and receiving probes 32 and 33, a high-damping probe having the arrangement shown in FIG. 1 is used. As the transmitting probe 32, however, a high-damping probe for longitudinal waves is used which is designed so that the transmission frequency is variable. The thickness D of the concrete 31 has previously been measured in units, for example, of 0.1mm, by another measuring means, for example, vernier calipers, the value D having been input to the controller 37. The controller 37 has also previously been stored with zero-point correction values for the longitudinal and shear waves. The couplants 34 and 35 are constituted of the same material.

Under these conditions, an ultrasonic pulse of a longitudinal wave is first transmitted from the probe 32. The pulse width, modulation mode and modulation index of the ultrasonic pulse transmitted may be properly selected. In this embodiment, however, the pulse width is assumed to be 5μsec, and the modulation mode and modulation index, $sin^4$.

Figure 4B:
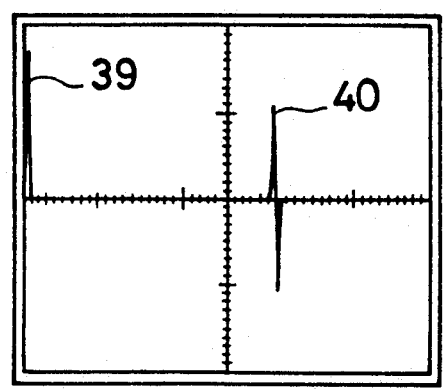

The ultrasonic pulse from the transmitting probe 32 is transmitted through the couplant 34, the concrete 31 and the couplant 35 and received by the receiving probe 33, and the received wave is displayed on the oscilloscope 36, as exemplarily shown in FIG. 4(b). In FIG. 4(b), the reference numeral 39 denotes the transmitted pulse, and 40 the pulse received after being transmitted through the concrete 31. In this state, the operator adjusts the respective positions of the transmitting and receiving probes 32 and 33 as well as the transmission frequency so that the amplitude of the received pulse 40 reaches its maximum. Thus, an ultrasonic wave which is conformable to the material of the concrete 31 can be transmitted and it is therefore possible to effect measurement with optimal propagation characteristic of the ultrasonic wave in the concrete 31.

When the maximum amplitude of the received pulse 40 is obtained by the adjustment, the operator instructs the controller 37 to execute a processing for obtaining the amplitude $Ph_L$ of the received pulse 40, the travelling period $T_L$ of the longitudinal wave through the concrete 31, the sound velocity $V_L$ of the longitudinal wave in the concrete 331 and the receive frequency $Rf_L$ of the longitudinal wave.

The amplitude $Ph_L$ of the received pulse 40 can be read from an attenuator (not shown) of an ultrasonic flaw detector (not shown). The travelling period $T_L$ of the longitudinal wave can be obtained by subtracting the longitudinal wave zero-point correction value $T_{L0}$ from the time interval between the transmission of the ultrasonic pulse 39 and the rise of the received pulse 40. More specifically, it is necessary in order to determine the compressive strength of the concrete 31 to obtain the period of time $T_L$ required for the ultrasonic pulse to travel through the concrete 31. In this case, however, the travelling period that is obtained from the waveform shown in FIG. 4(b) includes not only the travelling period through the concrete 31 but also the time required for the ultrasonic pulse to travel through the couplants 34 and 35. It is therefore necessary to subtract the travelling period regarding the couplants 34 and 35 from the overall travelling period.

After the travelling period $T_L$ of the longitudinal wave has been obtained in this way, the controller 37 obtains the sound velocity $V_L$ of the longitudinal wave according to the following equation (1):

$$V_L = D/T_L \tag{1}$$

The longitudinal wave receive frequency $Rf_L$ can be obtained by inputting the received pulse 40 to a signal analyzer (not shown) and reading the result of the analysis.

The received longitudinal wave pulse amplitude $Ph_L$(dB), longitudinal wave sound velocity $V_L$(m/s) and longitudinal wave receive frequency $Rf_L$(kHz) thus obtained are temporarily stored in the controller 37.

After ultrasonic information concerning the longitudinal wave has been obtained in this way, the transmitting probe 32 is replaced by a high-damping probe for shear waves which is designed so that the transmission frequency is variable to obtain ultrasonic information concerning the shear wave, that is, the received shear wave pulse amplitude Ph$_S$(dB), shear wave sound velocity VS(m/s) and shear wave receive frequency Rf$_S$(kHz), by the same technique as the above, the obtained ultrasonic information then being stored in the controller 37. To obtain these ultrasonic information concerning the shear wave, the waveform of the received shear wave is input to a signal analyzer and then converted into a frequency spectrum by, for example, a fast Fourier transform means, and the same processing as in the case of the longitudinal wave is executed.

After ultrasonic information concerning the longitudinal and shear waves has been obtained in this way, the controller 3 obtains the measured compressive strength $\sigma_U$(kg/cm$^2$) of the concrete 31 according to the following equation (2) and outputs the result to the output unit 38 which comprises a CRT, printer or the like.

$$\sigma = 0.37V_L + 0.53V_S - 0.28Rf_L + 0.05Rf_S + 3.24Ph_L - 0.11Ph_S - 2723.3 \quad (2)$$

The equation (2) was deduced by the inventor of the present application from the results of various experiments. It has been confirmed that errors in measurement of compressive strength based on the equation (2) are within the range of ±25kg/cm$^2$.

Figure 4C:
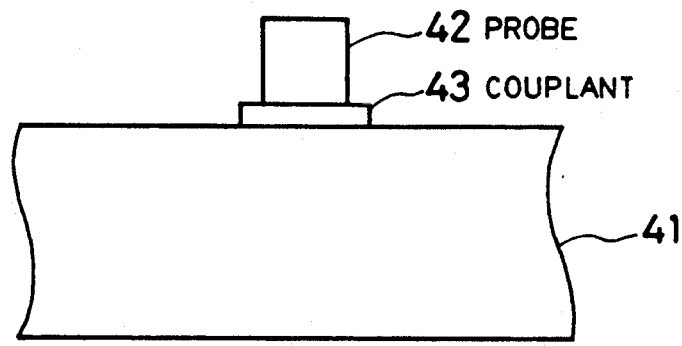
Figure 4D:
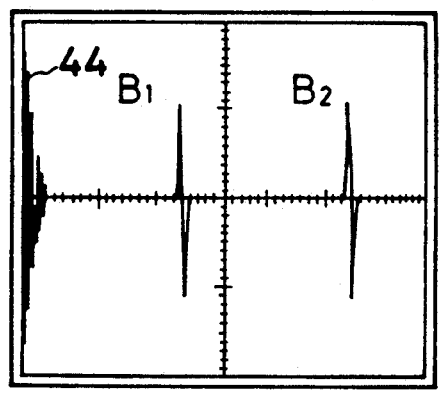
Figure 4E:
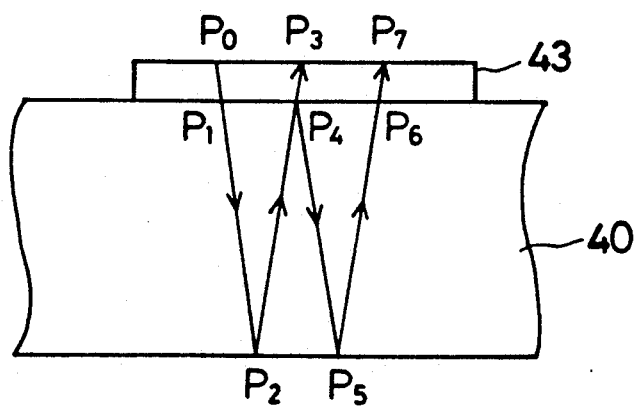

In the foregoing, the time required for the ultrasonic wave to travel through the couplant, that is, the zero-point correction value, is obtained by an arrangement such as that shown in FIG. 4(c). More specifically, a longitudinal wave normal probe 42 is disposed under a pressure employed in the actual measurement on one face of a reference test piece 41 made of a proper material through a couplant 43 comprising the same material as that used in the actual measurement, and an ultrasonic wave is transmitted from the probe 42. As a result, on an oscilloscope (not shown) are obtained a transmitted pulse 44 and two reflected waves B$_1$ and B$_2$, as shown in FIG. 4(d). It should be noted that the position of the longitudinal wave normal probe 42 and the transmission frequency of the ultrasonic flaw detector have already been adjusted so that the amplitude of the reflected wave will reach its maximum.

In FIG. 4(d), the reference symbol B$_1$ denotes a first received wave, that is, the ultrasonic wave transmitted from and received by the probe 42 after being reflected once from the other face of the reference test piece 41, and B$_2$ a second received wave, that is, the ultrasonic wave received after being reflected twice inside the reference test piece 41. More specifically, referring to FIG. 4(e), B$_1$ is the reflected wave of the ultrasonic wave that is transmitted from the point P$_0$, reflected from the point P$_2$ and received at the point P$_3$, and B$_2$ is the reflected wave from the point P$_2$ which is reflected again from the point P$_4$ at the boundary between the reference test piece 41 and the couplant 43, propagated via the points P$_5$ and P$_6$ and then received at the point P$_7$. Accordingly, assuming that the time interval between the transmission of the ultrasonic pulse and the rise of the first reflected wave B$_1$ is T$_1$ and the time interval between the transmission of the ultrasonic pulse and the rise of the second reflected wave B$_2$ is T$_2$, the travelling period T$_{LO}$ required for the ultrasonic wave to travel back and forth through the couplant 43 is obtained from the following equation (3), T$_{LO}$ being the zero-point correction value for the longitudinal wave normal probe.

$$T_{LO} = 2T_1 = T_2 \quad (3)$$

After the zero-point correction value T$_{LO}$ for the longitudinal wave normal probe has been obtained in this way, the zero-point correction value T$_{SO}$ for the shear wave normal probe is obtained in the same way and stored in the controller 37.

Thus, since the conventional single-pulse excitation system is replaced by a system which is adapted to be capable of varying the transmission frequency, it is possible to effect transmission and reception of an ultrasonic wave which is conformable to the material of each individual concrete and hence possible to improve the propagation characteristics of the ultrasonic wave in the concrete. Further, since a high-damping probe is used in place of the conventional free vibration type probe, it is possible not only to discriminate a necessary flaw signal or the like with ease but also to readily sample ultrasonic information which has heretofore been difficult to obtain, such as the propagation velocity in an object of inspection, the received frequency, the amplitude of the received pulse, etc.

As to the measurement of compressive strength, although the propagation velocity of the longitudinal wave alone has heretofore been employed, in the present invention the propagation velocity, the received frequency and the amplitude of the received pulse are obtained for each of the longitudinal and shear waves and compressive strength is determined by us of these six different kinds of ultrasonic information. Errors in measurement can therefore be markedly reduced from about +100kg/cm$^2$ to within ±25kg/cm$^2$.

As another form of use application of the high-damping probe according to the present invention, an ultrasonic measuring method which is suitable for measurement of the thickness of a concrete structure will next be explained with reference to FIGS. 5.

Figure 5A:
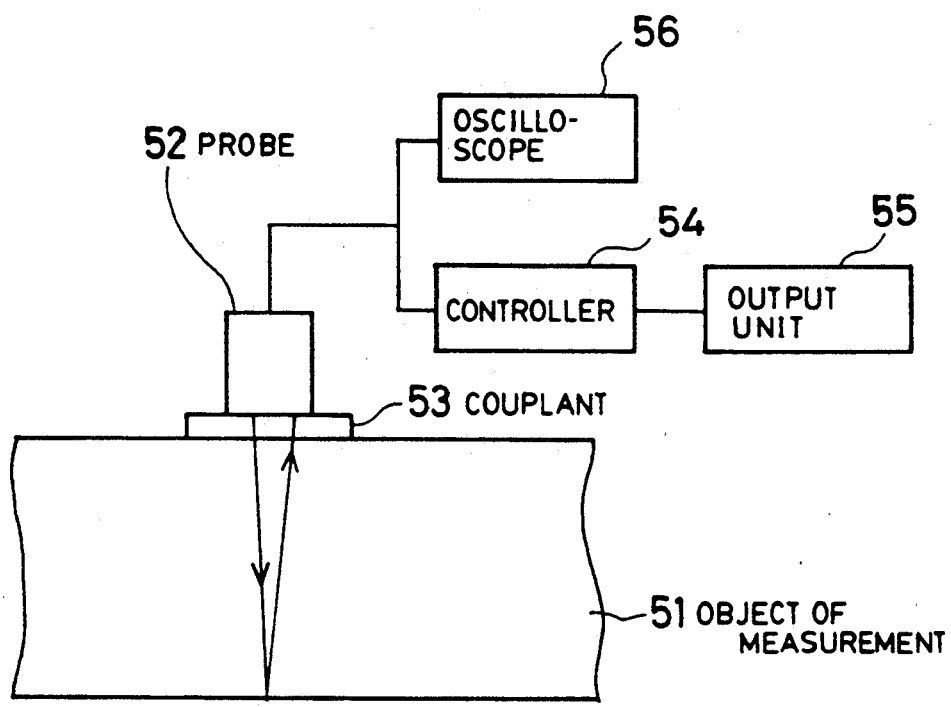
FIGS. 5(a)-5(d) illustrate measurement of the thickness of concrete using the high-damping probe according to the present invention.

FIG. 5(a) is a schematic view showing a method of measuring the thickness of a concrete structure by the ultrasonic pulse reflection method, in which the reference numeral 51 denotes an object of measurement for thickness, 52 a probe which effects transmission and reception, 53 a couplant, 54 a controller, 55 an output unit, and 56 an oscilloscope.

The probe 52 is a high-damping, low-frequency, longitudinal wave normal probe which is capable of both transmission and reception of an ultrasonic wave and which is designed so that the transmission frequency is variable. The controller 54 no only carries out various kinds of computation for measuring the thickness of an object, described below, but also controls the whole ultrasonic flaw detector concerned. The output unit 55 comprises a proper display device, for example, a CRT, or a printer.

Figure 5B:
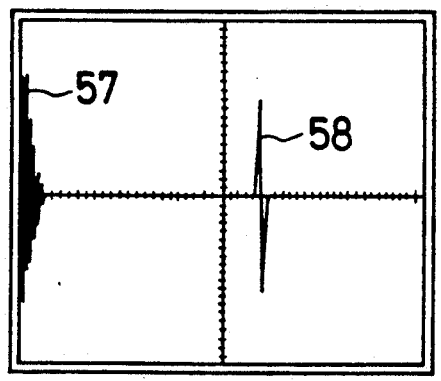

In this thickness measuring method, a single probe 52 is brought into contact with the surface of the object 51 through the couplant 53. The longitudinal wave normal ultrasonic wave that is transmitted from the probe 52 and reflected from the other face of the object 51 is received by the probe 52 and displayed on the oscilloscope 56. FIG. 5(b) is a chart exemplarily showing the waveform displayed on the oscilloscope 56, in which the reference numeral 57 denotes the transmission wave, and 58 the received wave.

In this state, the operator adjusts the transmission frequency and other necessary factors so that the height of the reflected wave reaches its maximum, while observing the oscilloscope 56. Thus, it is possible to use an ultrasonic wave having a frequency which is comformable to the material of the object 51 and hence possible to improve the propagation characteristics of the ultrasonic wave in the object 51.

When the height of the reflected wave reaches its maximum, the controller 54 retrieves the reflected wave and analyzes it to obtain the time interval between the transmission of the ultrasonic wave and the rise of the reflected wave. The controller 54 then subtracts the zero-point correction value obtained in advance from the time thus obtained to determine the travelling period T of the ultrasonic wave travelling through the object 51. Then, the controller 54 obtains the thickness D of the object 51 from the travelling period T and the reference sound velocity V in the object 51 obtained in advance and according to the following equation (4) and outputs it to the output unit 55.

$$D = V \times T/2 \tag{4}$$

In this way, the thickness of the object 51 is obtained. It should be noted that the zero-point correction value is obtained in the same way as that explained in connection with FIGS. 4(c) to 4(e). The reference sound velocity is measured as follow.

Figure 5C:
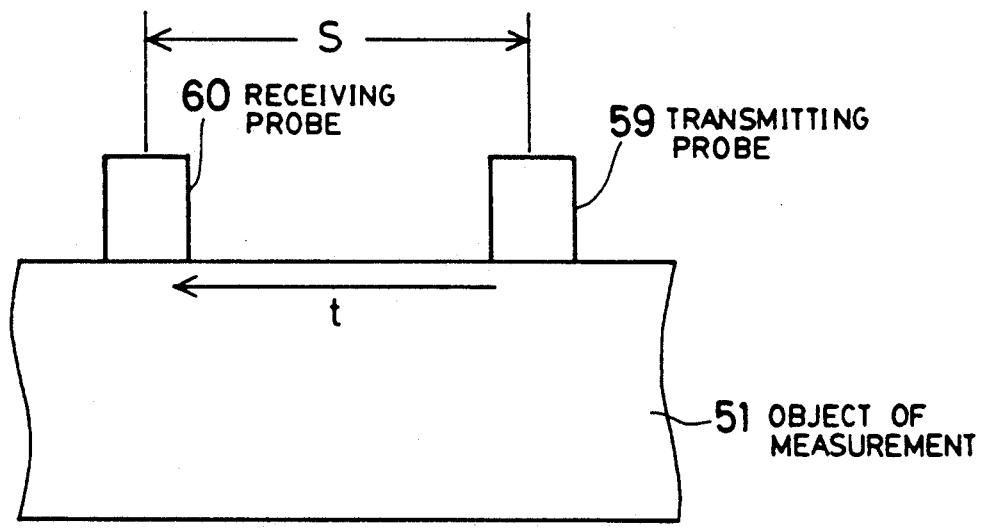
Figure 5D:
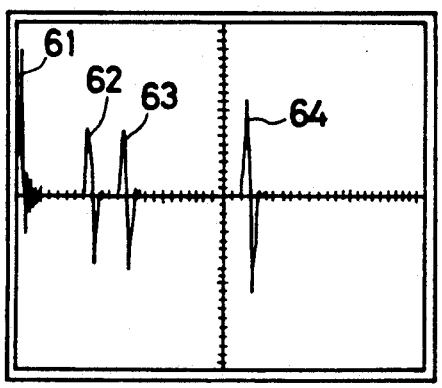
Figure 6:
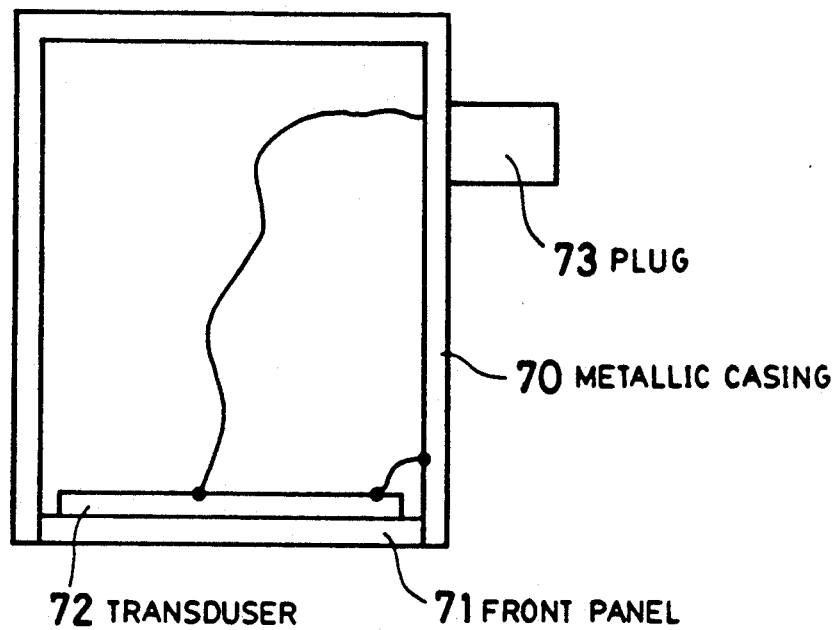
FIG. 6 shows the arrangement of a conventional probe.

As will be clear from the above equation (4), it is necessary in order to obtain the thickness of the object 51 to measure the reference sound velocity of the ultrasonic wave in the object 51 in advance. The sound velocity is measured in the manner described below. As shown in FIG. 5(c), a probe 59 for transmission and a probe 60 for reception are disposed on a non-deflective portion of the object 51, and the center distance S between the two probes 59 and 60 is adjusted to a predetermined value, for example, 70mm. It should be noted that, as each of the probes 59 and 60, a probe is used which is of the same type as that used to carry out the measurement shown in FIG. 5(a), i.e., a probe which is capable of both transmission and reception of the longitudinal wave. The longitudinal ultrasonic wave transmitted from the probe 59 is propagated through the object 51 and received by the probe 60. Thus, waveforms such as those shown in FIG. 5(d) are displayed on an oscilloscope (not shown). In the figure, the reference numeral 61 denotes the transmitted pulse, and 62, 63 and 64 denote the first, second and third received waves, respectively. It should be noted that the transmission frequency of the ultrasonic flaw detector has already been adjusted so that the height of the first received wave reaches its maximum.

Then, the received wave thus obtained is input to a signal analyzer (not shown) t obtain the time interval between the transmission of the ultrasonic wave and the rise of the first received wave 62, and the zero-point correction value is subtracted from the obtained time to determine the travelling period $t_{70}$ of the longitudinal wave travelling through the object 51. Then, the sound velocity $V_{70}$ of the longitudinal wave in the case where S=70mm is obtained according to the following equation (5):

$$V_{70} = S/t_{70} \tag{5}$$

The above-described measurement of the sound velocity of the longitudinal wave is similarly conducted under different conditions where the center distance S is 80mm and 90mm, respectively, and an average value $V_{av}$ of the longitudinal wave sound velocities is calculated by use of the obtained sound velocities $V_{70}$, $V_{80}$ and $V_{90}$ and according to the following equation (6) and then stored in the controller 54, the average value $V_{av}$ being the reference sound velocity.

$$V_{av} = (V_{70} + V_{80} V_{90})/3 \tag{6}$$

It has been confirmed that errors in measurement of the thickness of concrete conducted in the way described above are within the range of ±10mm.

Thus, in the method of measuring the thickness of concrete by use of the high-damping probe, the transmission frequency is variable and it is therefore possible to effect transmission and reception of an ultrasonic wave which is conformable to the material of each individual object of inspection, for example, concrete, and hence improve the propagation characteristics of the ultrasonic wave in the object. As a result, it becomes possible to measure up to about 500mm in thickness. Although the conventional probes for concrete have no low-frequency damper, the high-damping probe of the present invention has a low-frequency damper attached to the transducer and therefore enables clear discrimination of a necessary signal. In addition, measurement of thickness is effected by the reflection method using a single longitudinal wave normal probe in place of the double normal probe technique conventionally employed. There are therefore no problems which have heretofore been experienced in regard to the placement of the probes. Accordingly, it is possible to simplify the measuring process and hence measure the thickness of the object with ease and high accuracy. Since measurement of the reference sound velocity is effected o one side of the object by the surface scanning method, it is possible to measure the reference sound velocity and the thickness even in the case of an object having no opening.

In addition, errors in measurement are within the range of ±10mm, and the accuracy of measurement is therefore higher than in the case of the conventional measuring method.

Although in the foregoing embodiments concrete is employed as an object of testing, it should be noted that concrete is not necessarily exclusive and that timbers, fiber reinforced plastics (FRP) and so forth may also be employed as objects of testing.

What we claim is:

1. An ultrasonic measuring apparatus for measuring sonic velocity of a wave in a specimen comprising:
    a transmitting probe includes a high-damping probe including a transducer having a low-frequency damper attached thereto;
    a receiving probe includes a high-damping probe including a transducer having a low-frequency damper attached thereto;
    a first signal converting means for converting an output of said received probe into a frequency spectrum;
    a signal processing means for extracting only a desired transverse reflected wave component from an output of said first signal converting means;
    a second signal converting means for converting an output of said signal processing means into a time series signal; and
    a display means for displaying a signal waveform of said transverse reflected wave component output by said second signal converting means.

2. An ultrasonic measuring apparatus using a high-dampening probe, comprising:

a variable frequency transmitting means for generating a modulation pulse having a frequency, at which an amplitude of a reflected wave from a specimen, reaches a maximum;

a high-damping low-frequency longitudinal wave probe, having a high-dampening probe including a transducer with a low-frequency damper attached thereto, said probe connected to said variable frequency transmitting means, said probe transmitting by converting said modulation pulse generated by said variable frequency transmitting means into an ultrasonic wave, and said probe for receiving a reflected ultrasonic wave from the specimen; and a display means, connected to said probe, for displaying a waveform of a signal received by said high-damping low-frequency longitudinal probe.

* * * * *